(12) United States Patent
Huff et al.

(10) Patent No.: US 8,176,933 B2
(45) Date of Patent: May 15, 2012

(54) ANNULAR BOP PACKING UNIT

(75) Inventors: Philip A. Huff, Spring, TX (US); Shafiq Khandoker, Houston, TX (US); Stefan Butuc, The Woodlands, TX (US)

(73) Assignee: Hydril USA Manufacturing LLC, Houston, TX (US)

( * ) Notice: Subject to any disclaimer, the term of this patent is extended or adjusted under 35 U.S.C. 154(b) by 0 days.

(21) Appl. No.: 11/829,707

(22) Filed: Jul. 27, 2007

(65) Prior Publication Data

US 2008/0066906 A1     Mar. 20, 2008

Related U.S. Application Data

(60) Provisional application No. 60/847,760, filed on Sep. 28, 2006, provisional application No. 60/820,723, filed on Jul. 28, 2006, provisional application No. 60/862,392, filed on Oct. 20, 2006, provisional application No. 60/912,809, filed on Apr. 19, 2007.

(51) Int. Cl.
*F16K 17/20* (2006.01)

(52) U.S. Cl. .............. 137/315.02; 251/1.2; 277/324; 277/534; 166/84.3

(58) Field of Classification Search ........... 137/315.02; 277/324, 325, 627, 500, 534, 535, 540; 251/1.2, 251/1.1; 166/84.3, 84.4
See application file for complete search history.

(56) References Cited

U.S. PATENT DOCUMENTS

| | | | |
|---|---|---|---|
| 2,593,793 A | 4/1952 | Rector | |
| 2,609,836 A | 9/1952 | Knox | |
| 3,004,783 A * | 10/1961 | Webb | 277/512 |
| 3,667,721 A | 6/1972 | Vujasinovic | |
| 3,762,725 A * | 10/1973 | Taylor | 277/330 |
| 3,897,071 A | 7/1975 | Le Rouax | |
| 4,098,341 A | 7/1978 | Lewis | |
| 4,229,012 A | 10/1980 | Williams, III | |
| 4,371,483 A | 2/1983 | Mattson | |
| 4,485,719 A | 12/1984 | Mendelsohn et al. | |
| 4,550,895 A * | 11/1985 | Shaffer | 251/1.3 |
| 4,657,263 A | 4/1987 | Hynes et al. | |
| 4,930,745 A | 6/1990 | Granger et al. | |
| 5,116,017 A | 5/1992 | Granger et al. | |
| 5,207,956 A | 5/1993 | Kline et al. | |
| 5,213,339 A * | 5/1993 | Walworth | 277/314 |
| 5,224,557 A * | 7/1993 | Yenulis et al. | 175/195 |

(Continued)

OTHER PUBLICATIONS

Qi H J, Joyce K, Boyce M C. Durometer hardness and the stress-strain behavior of elastomeric materials. Rubber Chemistry and Technology [serial online]. 2003;76:419-435. Available from: ABI/INFORM Trade & Industry. Accessed Jan. 10, 2011, Document ID: 380147151.*

(Continued)

*Primary Examiner* — Craig Schneider
*Assistant Examiner* — Andrew J Rost
(74) *Attorney, Agent, or Firm* — Potomac Patent Group PLLC

(57) ABSTRACT

A packing unit for a blowout preventer includes an elastomeric, annular body configured to be disposed about a longitudinal axis of the blowout preventer and configured to be displaced radially inward towards the longitudinal axis upon actuation of the blowout preventer. The elastomeric, annular body includes a first section having a first set of material properties and a second section having a second set of material properties. The packing unit includes a plurality of rigid inserts distributed at equal radial distances from each other within the elastomeric annular body and about the longitudinal axis of the blowout preventer.

23 Claims, 6 Drawing Sheets

U.S. PATENT DOCUMENTS

| | | | |
|---|---|---|---|
| 5,361,832 | A | 11/1994 | Van Winkle |
| 5,729,463 | A | 3/1998 | Koenig et al. |
| 5,738,358 | A * | 4/1998 | Kalsi et al. .............. 277/544 |
| 5,784,283 | A | 7/1998 | Rimondi et al. |
| 5,851,013 | A * | 12/1998 | Simons .............. 277/327 |
| RE36,452 | E * | 12/1999 | Upton et al. .............. 277/336 |
| 6,345,834 | B1 | 2/2002 | Bianchini et al. |
| 6,542,859 | B1 | 4/2003 | Burns et al. |
| 6,554,247 | B2 | 4/2003 | Berckenhoff |
| 6,564,625 | B1 | 5/2003 | Ishiyama |
| 2001/0020386 | A1 | 9/2001 | Mancosu et al. |
| 2003/0067166 | A1 | 4/2003 | Sivley, IV |
| 2004/0017104 | A1 | 1/2004 | Fakhoury et al. |
| 2004/0066003 | A1 | 4/2004 | Griffin et al. |
| 2005/0264563 | A1 | 12/2005 | Macura et al. |
| 2006/0214380 | A1 * | 9/2006 | Dietle et al. .............. 277/559 |
| 2007/0140729 | A1 | 6/2007 | Carter et al. |
| 2008/0023865 | A1 | 1/2008 | Butuc et al. |
| 2008/0023917 | A1 | 1/2008 | Khandoker |
| 2008/0027693 | A1 | 1/2008 | Khandoker |

OTHER PUBLICATIONS

T.J.R. Hughes, J.A. Cottrell, Y. Bazilevs, "Isogeometric analysis: CAD, finite elements, NURBS, exact geometry and mesh refinement", Comput. Methods Appl. Mech. Engrg. 194 (2005) 4135-4195.

Technical Paper, "Nonlinear Finite Element Analysis of Elastomers", MSC. Software Corporation, 2000.

T. Lindby and J.L.T. Santos, "2-D and 3-D shape integrate analytical optimization using mesh velocities sensitivities with associative CAD", Structural Optimization 13, 213-222, Springer-Verlag 1997.

K.K. Choi, V. Ogarevic, J. Tang, and Y.H. Park, "CAD-Based Design Process for Fatigue Analysis, Eliabilityanalysis, and Design Optimization", Automotive Research Center, Oct. 2004.

Hardee, Edwin, "A CAD-based design parameterization for shape optimization of elastic solids", Advances in Engineering Software, 1999.

Tang, Poh-Soong, "Integration of topology and shape optimization for design of structural components", Industrial application and design case studies, 2001.

Bakhtiary, Nima, "A new approach for sizing, shape and topology optimization", SAE International Congress and Exposition, 1996.

Final Office Action issued on Apr. 27, 2010 in related U.S. Appl. No. 11/829,752.

Non-Final Office Action issued Mar. 22, 2011 in related U.S. Appl. No. 11/826,697.

Non-Final Office Action issued Oct. 1, 2009 in related U.S. Appl. No. 11/829,811.

Final Office Action issued Oct. 5, 2009 in related U.S. Appl. No. 11/829,752.

* cited by examiner

ANNULAR BOP PACKING UNIT

CROSS-REFERENCE TO RELATED APPLICATIONS

This Application claims the benefit of the following provisional applications under 35 U.S.C. 119(e): U.S. Provisional Patent Application Ser. No. 60/820,723 filed on Jul. 28, 2006; U.S. Provisional Patent Application Ser. No. 60/847,760 filed on Sep. 28, 2006; U.S. Provisional Patent Application Ser. No. 60/862,392 filed on Oct. 20, 2006; and U.S. Provisional Patent Application Ser. No. 60/912,809 filed on Apr. 19, 2007, all of which are incorporated by reference in their entirety herein.

BACKGROUND OF INVENTION

1. Field of the Invention

Embodiments disclosed herein generally relate to blowout preventers used in the oil and gas industry. Specifically, embodiments selected relate to an improved packing unit for use in an annular type blowout preventer.

2. Background Art

Well control is an important aspect of oil and gas exploration. When drilling a well, for example, in oil and gas exploration applications, safety devices must be put in place to prevent injury to personnel and damage to equipment resulting from unexpected events associated with the drilling activities.

Drilling wells in oil and gas exploration involves penetrating a variety of subsurface geologic structures, or "layers." Occasionally, a wellbore will penetrate a layer having a formation pressure substantially higher than the pressure maintained in the wellbore. When this occurs, the well is said to have "taken a kick." The pressure increase associated with the kick is generally produced by an influx of formation fluids (which may be a liquid, a gas, or a combination thereof) into the wellbore. The relatively high pressure kick tends to propagate from a point of entry in the wellbore uphole (from a high pressure region to a low pressure region). If the kick is allowed to reach the surface, drilling fluid, well tools, and other drilling structures may be blown out of the wellbore. These "blowouts" may result in catastrophic destruction of the drilling equipment (including, for example, the drilling rig) and substantial injury or death of rig personnel.

Because of the risk of blowouts, blowout preventers ("BOPs") are typically installed at the surface or on the sea floor in deep water drilling arrangements to effectively seal a wellbore until active measures can be taken to control the kick. BOPs may be activated so that kicks are adequately controlled and "circulated out" of the system. There are several types of BOPs, one common type of which is an annular blowout preventer.

Annular BOPs typically comprise annular, elastomeric "packing units" that may be activated to encapsulate drillpipe and well tools to completely seal about a wellbore. In situations where no drillpipe or well tools are within the bore of the packing unit, the packing unit can be compressed to such an extent that the bore is entirely closed, acting as a valve on the wellbore. Typically, packing units are used in the case of sealing about a drillpipe, in which the packing unit can be quickly compressed, either manually or by machine, to effect a seal about the pipe to prevent a well from blowing out.

An example of an annular BOP having a packing unit is disclosed in U.S. Pat. No. 2,609,836, ("Knox") and incorporated herein by reference in its entirety, the assignee of the present invention. The packing unit includes a plurality of metal inserts embedded in an elastomeric body. The metal inserts are typically spaced equal radial distances from one another about a longitudinal axis of the packing unit. The inserts provide structural support for the elastomeric body when the packing unit is radially compressed to seal against the well pressure. Upon compression of the packing unit about a drillpipe, or upon itself, to seal against the wellbore pressure, the elastomeric body is squeezed radially inward, causing the metal inserts to move radially inward as well.

FIG. 1A is an example of a prior art annular BOP 101 including a housing 102. The annular BOP 101 has a bore 120 extending therethrough and is disposed about a longitudinal axis 103. A packing unit 105 is disposed within the annular BOP 101 about the longitudinal axis 103. The packing unit 105 includes an elastomeric annular body 107 and a plurality of metallic inserts 109. The metallic inserts 109 are disposed within the elastomeric annular body 107 of the packing unit 105 and distributed at equal radial distances from one another about the longitudinal axis 103. The packing unit 105 includes a bore 111 concentric with the bore 120 of the BOP 101.

The annular BOP 101 is actuated by fluid pumped into opening 113 of a piston chamber 112. The fluid applies pressure to a piston 117, which moves the piston 117 upward. As the piston 117 moves upward, the piston 117 translates force to the packing unit 105 through a wedge face 118. The force translated to the packing unit 105 from the wedge face 118 is directed upward toward a removable head 119 of the annular BOP 101, and inward toward the longitudinal axis 103 of the annular BOP 101. Because the packing unit 105 is retained against the removable head 119 of the annular BOP 101, the packing unit 105 does not displace upward from the force translated to the packing unit 105 from the piston 117. However, the packing unit 105 does displace inward from the translated force, which compresses the packing unit 105 toward the longitudinal axis 103 of the annular BOP 101. In the event a drill pipe is located along the longitudinal axis 103, with sufficient radial compression, the packing unit 105 will seal about the drill pipe into a "closed position." The closed position is shown in FIG. 2B. In the event a drill pipe is not present, the packing unit 105, with sufficient radial compression, will completely seal the bore 111.

The annular BOP 101 goes through an analogous reverse movement when fluid is pumped into opening 115 of the piston chamber 112, instead of opening 113. The fluid translates downward force to the piston 117, such that the wedge face 118 of the piston 117 allows the packing unit 105 to radially expand to an "open position." The open position is shown in FIG. 2A. Further, the removable head 119 of the annular BOP 101 enables access to the packing unit 105, such that the packing unit 105 may be serviced or changed if necessary.

An example of the prior art packing unit 105 used in an annular BOP 101 is shown in FIG. 1B. As before, the packing unit 105 includes an elastomeric annular body 107 and a plurality of metallic inserts 109. The metallic inserts 109 are distributed equal radial distances from each other in the elastomeric annular body 107 of the packing unit 105. The packing unit 105 includes a bore 111. FIG. 1C shows an example of the prior art metallic insert 109, in which the metallic insert may be disposed within the elastomeric annular body 107 of the packing unit 105.

FIG. 2A shows an example of the prior art packing unit 105 in the open position, where the packing unit 105 is disposed within an annular BOP. As before, the packing unit 105 includes an elastomeric annular body 107 and a plurality of metallic inserts 109. The metallic inserts 109 are distributed equal radial distances from each other in the elastomeric annular body 107 of the packing unit 105. The packing unit 105 includes a bore 111. Further, a drill pipe 301 is located along the longitudinal axis 103 of the annular BOP. In the open position, the packing unit 105 does not compress to seal about the drill pipe 301. Therefore, a gap is formed between the elastomeric annular body 107 of the packing unit 105 and the drill pipe 301. The open position of an annular BOP is meant to allow pressure to pass through the annular BOP.

FIG. 2B shows an example of the closed position of the packing unit 105. In the closed position, the elastomeric annular body 107 is compressed to seal about the drill pipe 301, such that pressure is not allowed to pass through the annular BOP. In the event the packing unit 105 is sealing from a blowout, the BOP may seal against wellbore pressure from the blowout coming from below.

FIG. 3 is an example of a prior art spherical BOP 301 disposed about a longitudinal axis 103. FIG. 3 is taken from U.S. Pat. No. 3,667,721 (issued to Vujasinovic and incorporated by reference in its entirety). The spherical BOP 301 includes a lower housing 303 and an upper housing 304 releasably fastened together by a plurality of bolts 311. Typically, the housing members 303 and 304 have a curved, semispherical inner surface. A packing unit 305 is disposed within the spherical BOP 301 about the longitudinal axis 103. The packing unit 305 includes a curved, elastomeric annular body 307 and curved metallic inserts 309 to correspond to the curved, semi-spherical inner surface of the housing members 303 and 304. The metallic inserts 309 are then distributed equal radial distances from one another within the curved, elastomeric annular body 307. The spherical BOP 301 may be actuated by fluid, similar to the annular BOP 101 of FIG. 1A as described above.

Increased demand for higher pressure containment and longevity make continued improvements to packing units desirable.

SUMMARY OF INVENTION

In one aspect, embodiments disclosed herein relate to a packing unit for a blowout preventer. The packing unit comprises an elastomeric, annular body configured to be disposed about a longitudinal axis of the blowout preventer and configured to be displaced inwardly toward the longitudinal axis upon actuation of the blowout preventer. The elastomeric, annular body comprises a first section having a first set of material properties and a second section having a second set of material properties. The packing unit further comprising a plurality of rigid inserts distributed at equal radial distances from each other within the elastomeric annular body and about the longitudinal axis of the blowout preventer.

In another aspect, embodiments disclosed herein relate to a method of designing a packing unit for a blowout preventer. The method comprises determining a strain state of an elastomeric, annular body at which the elastomeric, annular body is displaced inwardly towards a longitudinal axis upon actuation of the blowout preventer, and identifying a first section and a second section based upon the strain state of the elastomeric, annular body. The method further comprises selecting a first set of material properties for the first section based upon the strain state of the elastomeric, annular body, and selecting a second set of material properties for the second section based upon the strain state of the elastomeric, annular body.

In another aspect, embodiments disclosed herein relate to a blowout preventer comprising a housing, a piston chamber formed in the housing, a piston disposed within the piston chamber, and a packing unit disposed in the blowout preventer. The packing unit comprises an elastomeric, annular body, wherein the elastomeric, annular body comprises a first section having a first set of material properties, and a second section having a second set of material properties. Upon actuation of the piston, the packing unit is displaced radially inward.

Other aspects and advantages of the invention will be apparent from the following description and the appended claims.

DETAILED DESCRIPTION

Figure 1A:
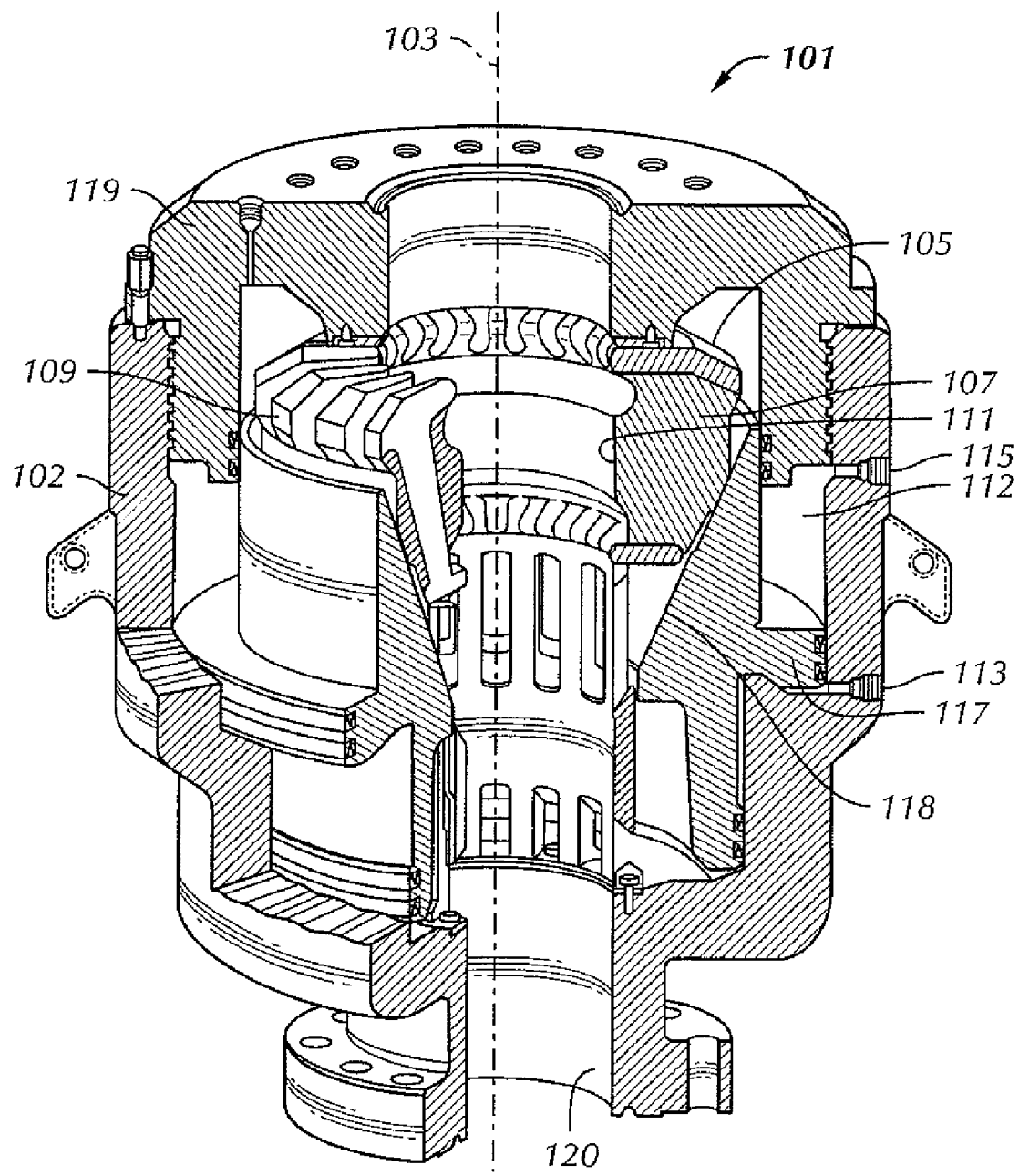
FIG. 1A is a cutaway view of a prior art annular blowout preventer.
Figure 1B:
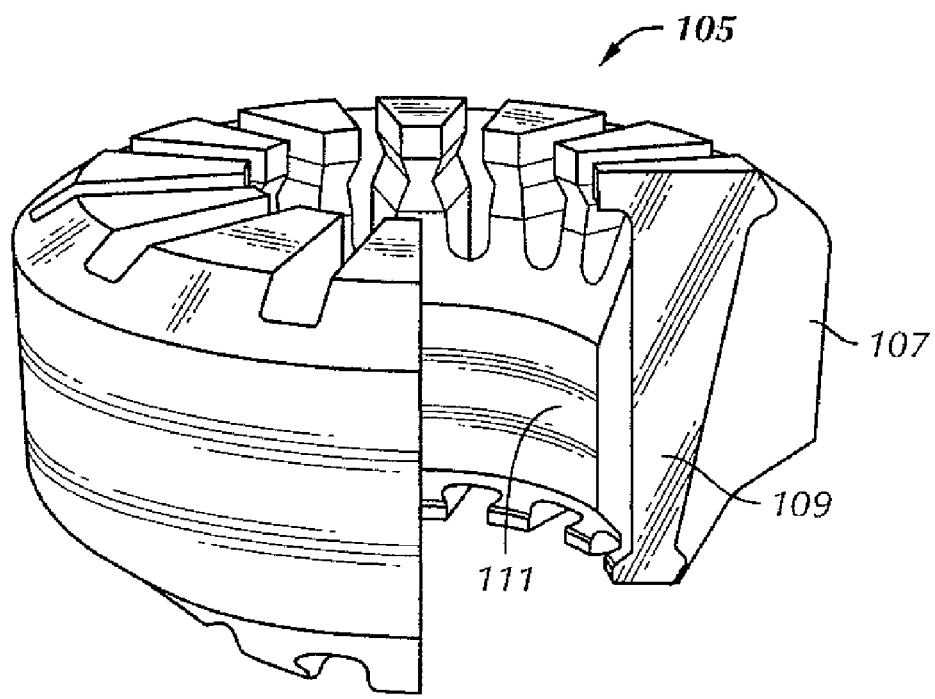
FIG. 1B is a cutaway view of a prior art annular blowout preventer packing unit.

In a typical annular BOP arrangement, the compression of the packing unit from the open position to the closed position creates significant stress within the elastomeric body. The radial stresses attributed to compressing the packing unit with the BOP are distributed about the elastomeric body. In addition, in the closed position, the wellbore pressure may exert an upward force on the elastomeric body, resulting in further stress within the elastomeric body in the stretched and extended section of the elastomeric body. That is, on certain sections of the elastomeric body, there are significant forces acting on the packing unit in two directions, radially inward and axially upward.

When an element is stressed, the element will undergo strain, or elongation, to accommodate the stress. The more stress exerted to an element, the more strain the element will undergo. Some of the principal characteristics of viscoelastic materials (such as the elastomeric body of a packing unit) include: if an applied stress is held constant, the strain within the material increases with time (referred to as creep) and conversely, if strain is held constant, the stress within the material decreases with time (referred to as relaxation); and higher strain and lower temperatures lead to increased yield strength and modulus of elasticity and decreased elongation of the material.

The modulus of elasticity is the measure of the rate of change between stress and strain that may be described as a material's tendency to be deformed when force is applied to the material. A material with a high modulus of elasticity will undergo less strain than a material with a low modulus of elasticity when subjected to the same stress. In the case of the packing unit, as the packing unit is stressed, it will strain to accommodate the stress, such that the packing unit will stretch and extend around the drill pipe. Strain is then exerted in variable patterns across the packing unit. The largest amount of strain occurs at the section of the packing unit sealing the wellbore pressure. The smallest amount of strain occurs at the section of the elastomeric body that is physically constrained within the annular BOP.

The elongation of a material refers to the percentage change in length of a material. The maximum amount of tensile strain to which a material can be subjected, or elongate, before failure (e.g. tearing, cracking, or breaking) of the material is referred to as the elongation at break. A material may have a high or low modulus of elasticity, but with a low elongation at break, the material will fail without undergoing much strain.

The tensile strength of a material is the maximum amount of tensile stress that a material may be subject to before failure. As stress is created within the material, the material will strain to accommodate the stress. The point at which plastic deformation begins to occur is referred to as the yield strength. Once the stress is too overbearing for the material, the material will no longer be able to strain to accommodate the stress, and the material will fail. The stress level at the failure point of the material is known as the tensile strength or ultimate strength.

Furthermore, if cyclic loading is applied to an elastomeric material, hysteresis (a phase lag) may occur, leading to a dissipation of mechanical energy. Hysteresis may occur, in one instance, where there is stress-induced softening. This may be described as an instantaneous and irreversible softening for a material that occurs when an applied load increases beyond any prior maximum value, resulting in a shift of the stress-strain curve of the material. This stress-induced softening, which may also be referred to as the Mullin's effect, is thought to be at least partially attributed to the microscopic breakage of links in a material. This weakens the material during an initial deformation so that the material is, in turn, weaker in subsequent deformations of the material.

Figure 4:
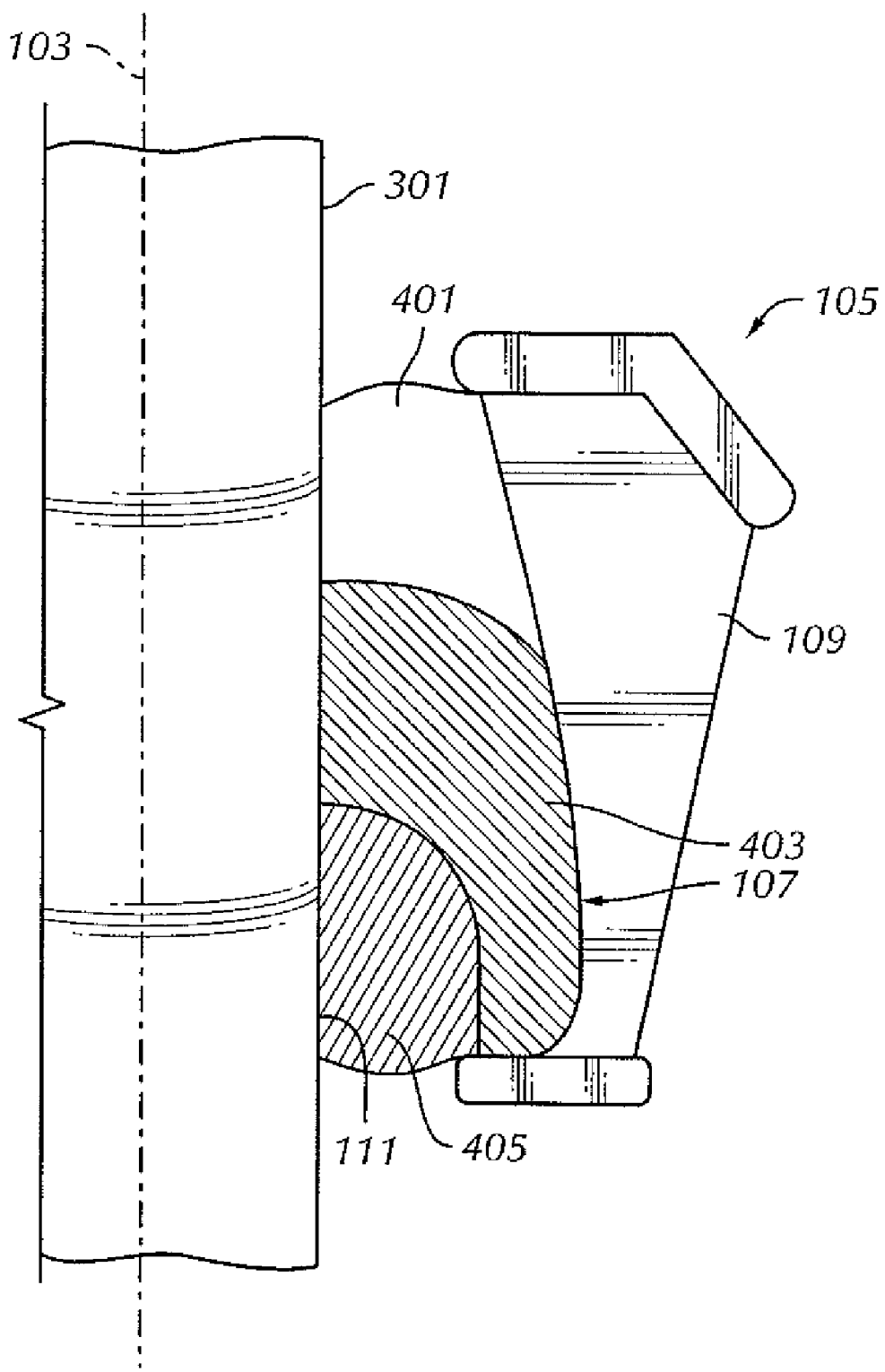
FIG. 4 is a cross-sectional view of the strain state of an annular blowout preventer packing unit in the closed position in accordance with embodiments of the present disclosure.

FIG. 4 shows the strain state of the packing unit 105 in the closed position in accordance with embodiments of the present disclosure. The elastomeric annular body 107 of the packing unit 105 is subject to a variety of strains in the closed position, such that the strains vary in range from very high strains to relatively low strains. A high strain section 405 is in the lower portion of the elastomeric annular body 107 surrounding the drill pipe 301. A medium strain section 403 surrounds the high strain section 405. Further, a low strain section 401 sits above the medium strain section 403. The arrangement of the high strain section 405, the medium strain section 403, and the low strain section 401 may be clearly seen in FIG. 4. The high strain section 405 of the elastomeric annular body 107 is the portion of the elastomeric annular body 107 that most effectively creates a pressure seal about the drill pipe 301 in the closed position of the packing unit 105. The low strain section 401 undergoes the least amount of strain of the elastomeric annular body 107 because of the physical constraint of the low strain section 401 within the annular BOP.

Such high strains may cause fatigue and weakening in the elastomeric body, especially after repeated closures of the packing unit, limiting the number of closures and the useful life of the packing unit. Strain acting in more than one direction may further contribute to the deterioration and rupture of the packing unit, such as the strain from compression of the packing unit and the strain from the wellbore pressure from below the packing unit.

The embodiments disclosed herein provide a packing unit wherein large amounts of strain may be accommodated within the packing unit by varying the material properties between sections of the packing unit. The material properties of each section may be selected according to the anticipated stress and strain that the section will undergo in operation.

Figure 5:
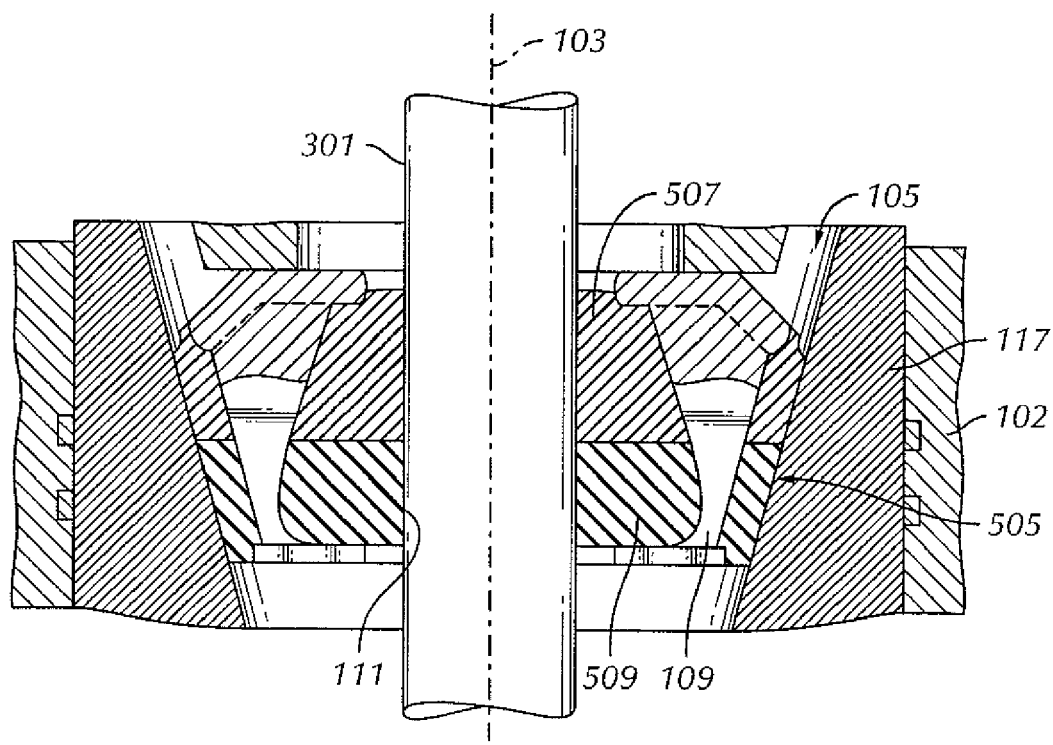
FIG. 5 is a cross-sectional view of an annular blowout preventer packing unit in accordance with embodiments of the present disclosure.

FIG. 5 is a cross-sectional view of a packing unit 105 in accordance with embodiments of the present disclosure. The packing unit 105 is disposed within an annular BOP such that the packing unit 105 is seated against a piston 117 of the annular BOP. The packing unit 105 includes an elastomeric annular body 505, a plurality of metallic inserts 109, and a bore 111. Generally, the metallic inserts 109 are distributed at equal radial distances from each other within the elastomeric annular body 505 about the bore 111. Thus, equal portions of the elastomeric annular body 505 may be disposed between the metallic inserts 109. As shown, the elastomeric annular body 505 includes a first section 507 and a second section 509 such that the first section 507 is located above the second section 509. The first section 507 is made of a first elastomeric compound and the second section 509 is made of a second elastomeric compound. The first elastomeric compound and the second elastomeric compound have different material properties.

Of the differing material properties of the elastomeric compounds, the first elastomeric compound may have a higher modulus of elasticity than the second elastomeric compound. The first elastomeric material, with a higher modulus of elasticity, will undergo less strain than the second elastomeric compound when the compounds are subjected to the same force or stress. When strained in the closed position, the second section 509 of the packing unit 105 typically experiences more strain than the first section 507. Therefore, the second section 509, made of the second elastomeric compound, maybe provided with a lower modulus of elasticity than the first section 507 in order to accommodate the higher strain.

The first elastomeric compound may also have a lower elongation at break than the second elastomeric compound. Because the first section 507 does not undergo as much strain as the second section 509, the first elastomeric compound of the first section 507 does not have to elongate as much as the second elastomeric compound of the second section 509. Therefore, the elongation of the first elastomeric compound may be lower than the second elastomeric compound.

Further, the first elastomeric compound may also have a higher tensile strength than the second elastomeric compound. As discussed above, as stress is exerted upon the material, the material will strain to accommodate the stress, and the maximum amount of tensile stress that a material may be subject to before failure is the tensile strength. The first elastomeric compound may therefore have a higher tensile strength than the second elastomeric compound to accommodate the stress with the lower amounts of strain to which the first section is subjected.

Additionally, the first elastomeric compound may have a lower durometer than the second elastomeric compound. Durometer refers to a material's measured hardness or resistance to permanent indentation, which is measured as a depth of indentation of a material created by a given force on a standardized pressure foot. The depth of indentation is dependent on the hardness of the material, its viscoelastic properties, including those described above, the shape of the pressure foot, and the duration of the test. Thus, by varying any of the viscoelastic properties of a particular elastomeric compound, the durometer may be effected as well. Thus, because the second section 509 of the packing unit 105 typically experiences more strain than the first section 507, the second section 509, made of the second elastomeric compound, maybe provided with a higher durometer than the first section 507 in order to accommodate the higher strain and resist permanent indentation.

Figure 6:
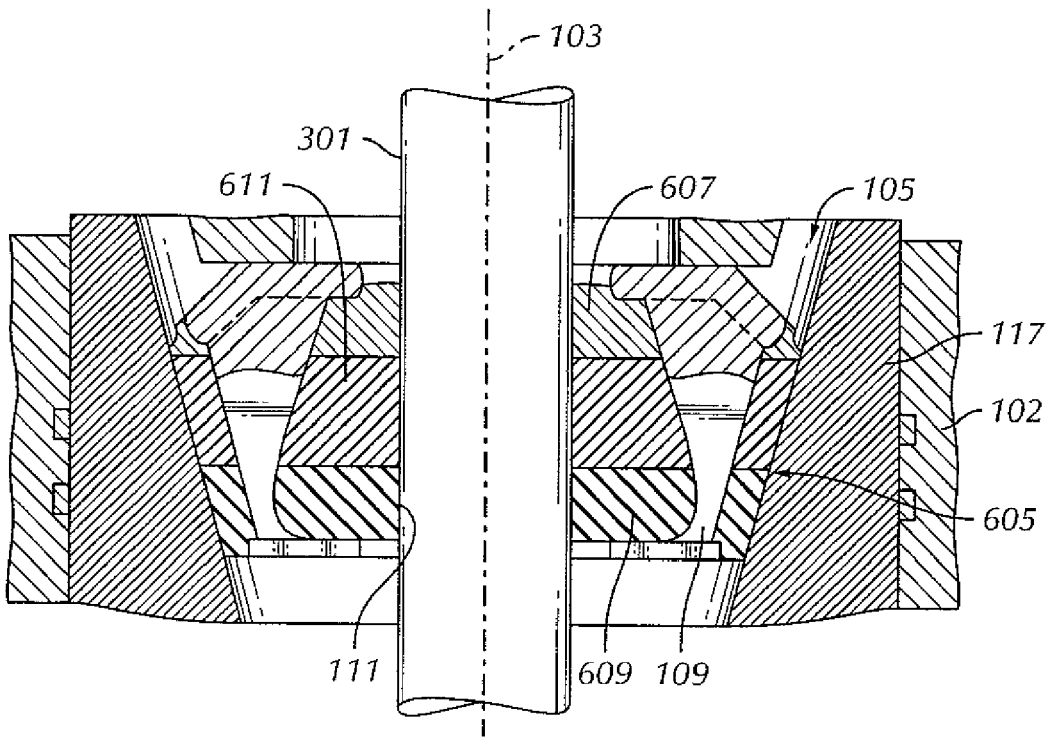
FIG. 6 is a cross-sectional view of an annular blowout preventer packing unit in accordance with embodiments of the present disclosure.

FIG. 6 is a cross-sectional view of a packing unit 105 in accordance with embodiments of the present disclosure. The packing unit 105 is disposed within an annular BOP such that the packing unit 105 is seated against a piston 117 of the annular BOP. The packing unit 105 includes an elastomeric annular body 605, a plurality of metallic inserts 109, and a bore 111. The metallic inserts 109 may be distributed at equal radial distances from each other within the elastomeric annular body 605 about the bore 111. The elastomeric annular body 605 includes a first section 607, a second section 609, and a third section 611. The first section 607 is located above the second section 609, and the third section 611 is located between the first section 607 and the second section 609. The first section 607 is made of a first elastomeric compound, the second section 609 is made of a second elastomeric compound, and the third section 611 is made of a third elastomeric compound. The first elastomeric compound, the second elastomeric compound, and the third elastomeric compound have different material properties.

Similar to the embodiment shown in FIG. 5, the first elastomeric compound may have a higher modulus of elasticity and tensile strength, and a lower elongation and durometer than the second elastomeric compound. The third elastomeric compound may then vary in material properties such that the third elastomeric compound may have properties ranging from similar to that of the first elastomeric compound to that of the second elastomeric compound. With material properties similar to that of the first elastomeric compound, the third section 611 would not strain as much as the second elastomeric compound of the second section 609. Therefore, the third section 611 would direct strain to the second section 609 of the packing unit. With material properties similar to that of the second elastomeric compound, instead of directing strain to the second section 609, the third section 611 would absorb the strain, relieving some of the strain from the second section 609. However, those having ordinary skill in the art will appreciate that the material properties used for the third elastomeric compound may vary without departing from the scope of the present invention.

The location and number of the sections within the packing unit may be varied and arranged in many different patterns for different applications and needs. For example, the embodiment shown in FIG. 6 may be arranged with more than three sections. An embodiment of four sections, five sections, and more, made from a variety of elastomeric compounds, could be easily shown without departing from the scope of the present invention. Further, the invention would include arrangements in which the first section of the elastomeric, annular body would align vertically about the drillpipe, and all subsequent sections of the elastomeric, annular body would extend radially outward from the first section. Those having ordinary skill in the art will appreciate that the sections of the packing unit may be relocated to different areas, volumes, or locations, based upon design constraints, without departing from the scope of the present invention. As well, those having ordinary skill in the art will appreciate that the number of sections within the packing unit may vary, beginning with at least two sections, without departing from the scope of the present invention.

In another embodiment of the present disclosure, the sections of the elastomeric, annular body of the packing unit may be made from the same elastomeric compound, only with a variation in the manufacturing process. For example, two or more elastomeric compounds may be chemically identical, but the elastomeric compounds may be milled to have different material properties. One of the elastomeric compounds may be milled to be substantially isotropic such that the elastomeric compound will show the same material properties independent of the direction the elastomeric compound is tested in. Then another elastomeric compound may be milled to be substantially anisotropic such that the elastomeric compound has a flow direction and the elastomeric compound will show different material properties for the different directions the elastomeric compound is tested. The sections of the packing unit may be formed from a variation of the two differently milled elastomeric compounds, or only from the anisotropic elastomeric rubber compound such that the flow direction of the elastomeric compound is varied across the packing unit.

All of the embodiments of the present disclosure up to this point have shown the packing unit to include at least two sections with a detectable separation between the sections. In another embodiment, the sections of the elastomeric, annular body of the packing unit may be molded together to form one monolithic mass, with no detectable separation between the sections. The "seam" between the sections would no longer be detectable. Instead, a smooth transition would occur from section to section. The sections of the packing unit would then provide a smooth continuous gradient of material properties, instead of separation of properties across the seams of the packing unit.

Figure 1C:
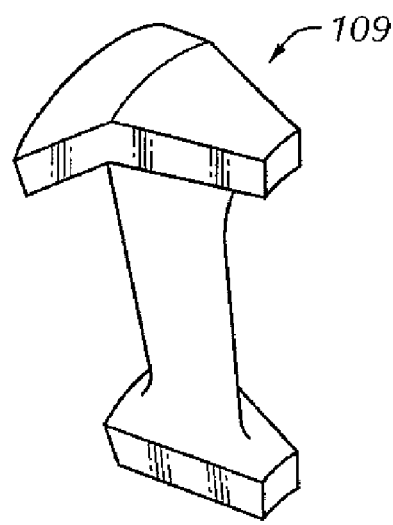
FIG. 1C is an isometric view of a prior art insert.
Figure 2A:
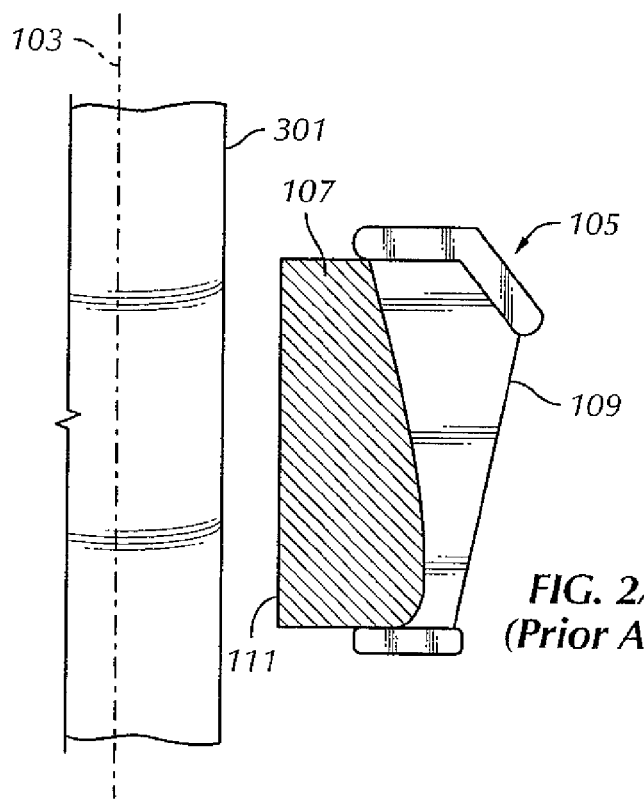
FIG. 2A is a cross-sectional view of a prior art annular blowout preventer packing unit in the open position.
Figure 2B:
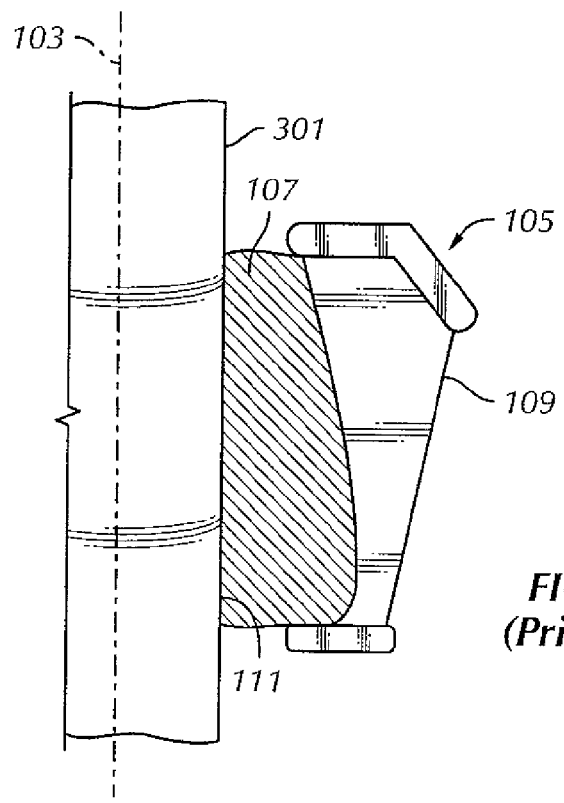
FIG. 2B is a cross-sectional view of a prior art annular blowout preventer packing unit in the closed position.

Further, in another embodiment, all of the embodiments of the present disclosure up to this point have assumed the relative size and shape of the metallic inserts to be substantially the same. That is, the plurality of metallic inserts distributed and disposed within the elastomeric, annular body of the packing units disclosed herein have a consistent shape and size between them. However, in another embodiment, for example, larger metallic inserts of an I-beam shape, as shown in FIG. 1C, may be alternated with smaller metallic inserts of a T-shape. Thus, the present invention is not limited to the metallic inserts remaining substantially the same in size and shape about the elastomeric, annular body of the packing unit.

Figure 3:
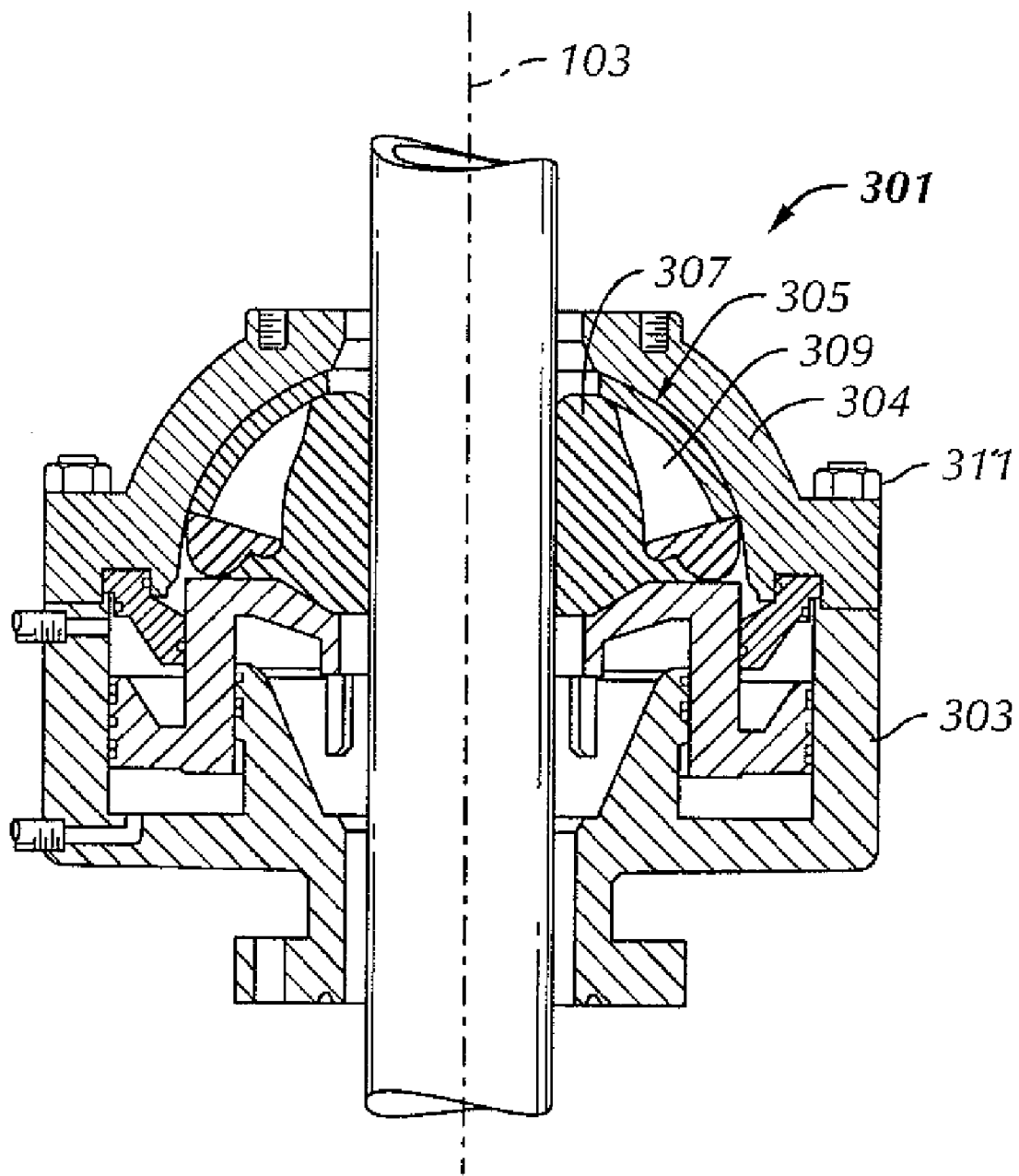
FIG. 3 is a cross-sectional view of a prior art spherical blowout preventer.

Furthermore, in another embodiment, the packing unit may be used in a spherical BOP, in addition to an annular BOP. All of the embodiments described up to this point have been shown for use within an annular BOP. However, embodiments of the present disclosure may also be used within a spherical BOP, as shown in FIG. 3. Thus, the present invention is not limited to only use within an annular BOP.

Embodiments disclosed herein may have one or more of the following advantages. A packing unit in accordance with embodiments disclosed herein may be more adequately manufactured to accommodate the various levels of strain that occur in a particular area or volume of a packing unit. In one example, industry requirements, such as API 16A/ISO 13533:2001, may be used as specified criteria to compare and certify a seal model. In particular, API 16A, Section 5.7.2 references a "closure test" for ram-type blowout preventers, while API 16A, Section 5.7.3 references a closure test for annular-type blowout preventers. Under API 16A/ISO 13533: 2001, a packing unit may be required to undergo six closures about the drill pipe and, on a seventh closure, be capable of effectively sealing against pressure of about 200-300 psi (1.4-2.1 MPa). Such a packing unit would have an increased service life, being a considerable economic advantage.

Embodiments disclosed herein may also be designed to replace existing packing units in existing annular BOPs. For example, a BOP, similar to that shown in FIG. 1A and/or FIG. 3, may have the removable head or removable housing detached. A packing unit in accordance with embodiments disclosed herein may then be installed to replace an existing packing unit disposed within the BOP. Although such an embodiment may require modification to the BOP, significant savings may be achieved by reusing components. In some embodiments, the present invention may also replace prior art packing units without modification to the BOP.

While the invention has been described with respect to a limited number of embodiments, those skilled in the art, having benefit of this disclosure, will appreciate that other embodiments may be devised which do not depart from the scope of the invention as disclosed herein. Accordingly, the scope of the invention should be limited only by the attached claims.

What is claimed is:

1. A packing unit for a blowout preventer, comprising:
   an elastomeric, annular body configured to be disposed about a longitudinal axis of the blowout preventer and configured to be displaced inwardly toward the longitudinal axis upon actuation of the blowout preventer;
   wherein the elastomeric, annular body comprises a first section having a first set of material properties and a second section having a second set of material properties and wherein spatial distributions of the first and second sections within the elastomeric, annular body are determined based on a strain analysis of the elastomeric, annular body when the blowout preventer is in a closed position such that the first section corresponds to a low strain and the second section corresponds to a high strain and the low strain is lower than the high strain,
   wherein the second section is configured to provide a first seal for a fluid flowing through the packing unit and the first section is configured to provide a second seal for such fluid that leaks past the first seal, and
   wherein the first section is provided at a first end of the elastomeric, annular body, along the longitudinal axis, and the second section is provided at a second end of the elastomeric, annular body, along the longitudinal axis; and
   a plurality of rigid inserts distributed at equal radial distances from each other within the elastomeric annular body and along the longitudinal axis of the blowout preventer, the rigid inserts extending along the first and second sections and configured to press the first and second sections towards the longitudinal axis of the blowout preventer.

2. The packing unit of claim 1, wherein the first section is made of a first elastomeric compound and the second section is made of a second elastomeric compound.

3. The packing unit of claim 1, wherein the first section has a higher modulus of elasticity than the second section.

4. The packing unit of claim 1, wherein the first section has a lower elongation than the second section.

5. The packing unit of claim 1, wherein the first section has higher tensile strength than the second section.

6. The packing unit of claim 1, wherein the first section is located above the second section.

7. The packing unit of claim 1, wherein the first section and the second section are combined to provide a transition from the first set of material properties to the second set of material properties.

8. The packing unit of claim 1, wherein the annular body further comprises a third section having a third set of material properties.

9. The packing unit of claim 1, wherein the plurality of rigid inserts comprise a plurality of metallic inserts distributed in the annular body about the longitudinal axis such that the metallic inserts extend through the first and second sections.

10. The packing unit of claim 1, wherein the blowout preventer is one of an annular blowout preventer and a spherical blowout preventer.

11. A method of designing a packing unit for a blowout preventer, the method comprising:
    determining a strain state of an elastomeric, annular body at which the elastomeric, annular body is displaced inwardly towards a longitudinal axis upon actuation of the blowout preventer;
    identifying a first section and a second section based upon the strain state of the elastomeric, annular body, wherein spatial distributions of the first and second sections within the elastomeric, annular body are determined based on the strain state of the elastomeric, annular body when the blowout preventer is in a closed position such that the first section corresponds to a low strain and the second section corresponds to a high strain and the low strain is lower than the high strain,
    wherein the second section is configured to provide a first seal for a fluid flowing through the packing unit and the first section is configured to provide a second seal for such fluid that leaks past the first seal, and
    wherein the first section is provided at a first end of the elastomeric, annular body, along the longitudinal axis, and the second section is provided at a second end of the elastomeric, annular body, along the longitudinal axis;
    selecting a first set of material properties for the first section based upon the strain state of the elastomeric, annular body; and
    selecting a second set of material properties for the second section based upon the strain state of the elastomeric, annular body.

12. The method of claim 11, further comprising:
    selecting a first elastomeric compound for the first section based upon the first set of material properties; and
    selecting a second elastomeric compound for the second section based upon the second set of material properties.

13. The method of claim 11, further comprising:
    identifying a third section based upon the strain state of the elastomeric, annular body; and
    selecting a third set of material properties for the third section based upon the strain state of the elastomeric, annular body.

14. The method of claim 13, further comprising:
    selecting a third elastomeric compound for the third section based upon the third set of material properties.

15. A blowout preventer having a longitudinal axis, the blowout preventer comprising:
    a housing;
    a piston chamber formed in the housing;
    a piston disposed within the piston chamber; and
    a packing unit disposed in the blowout preventer, the packing unit comprising:
    an elastomeric, annular body,
    wherein the elastomeric, annular body comprises a first section having a first set of material properties and a second section having a second set of material properties,
    wherein spatial distributions of the first and second sections within the elastomeric, annular body are determined based on a strain analysis of the elastomeric, annular body when the blowout preventer is in a closed position such that the first section corresponds to a low strain and the second section corresponds to a high strain and the low strain is lower than the high strain, wherein the second section is configured to provide a first seal for a fluid flowing through the packing unit and the first section is configured to provide a second seal for such fluid that leaks past the first seal, wherein the first section is provided at a first end of the elastomeric, annular body, along the longitudinal axis, and the second section is provided at a second end of the elastomeric, annular body, along the longitudinal axis, and wherein upon actuation of the piston, the first and second sections are displaced radially inward such that a first strain is present in the first section and a second strain, different from the first strain, is present in the second section; and a plurality of rigid inserts distributed at equal radial distances from each other within the elastomeric annular body and along the longitudinal axis of the blowout preventer, the rigid inserts extending along the first and second sections and configured to press the first and second sections towards the longitudinal axis of the blowout preventer.

16. The annular blowout preventer of claim 15, wherein the first section of the packing unit is made of a first elastomeric compound and the second section of the packing unit is made of a second elastomeric compound.

17. The annular blowout preventer of claim 15, wherein the first section has a higher modulus of elasticity than the second section.

18. The annular blowout preventer of claim 15, wherein the first section of the packing unit has a lower elongation than the second section of the packing unit.

19. The annular blowout preventer of claim 15, wherein the first section of the packing unit has higher tensile strength than the second section of the packing unit.

20. The annular blowout preventer of claim 15, wherein the first section of the packing unit is located above the second section of the packing unit.

21. The annular blowout preventer of claim 15, wherein the first section and the second section of the packing unit are combined to provide a transition from the first set of material properties to the second set of material properties.

22. The annular blowout preventer of claim 15, wherein the annular body of the packing unit further comprises a third section having a third set of material properties.

23. The annular blowout preventer of claim 15, wherein the plurality of rigid inserts comprise a plurality of metallic inserts distributed in the annular body of the packing unit about the longitudinal axis such that the metallic inserts extend through the first and second sections.

\* \* \* \* \*